Nov. 4, 1958 W. P. REID 2,859,061
COMPOSITE SEALING RING AND METHOD OF MAKING THE SAME
Filed Sept. 17, 1954 4 Sheets-Sheet 1
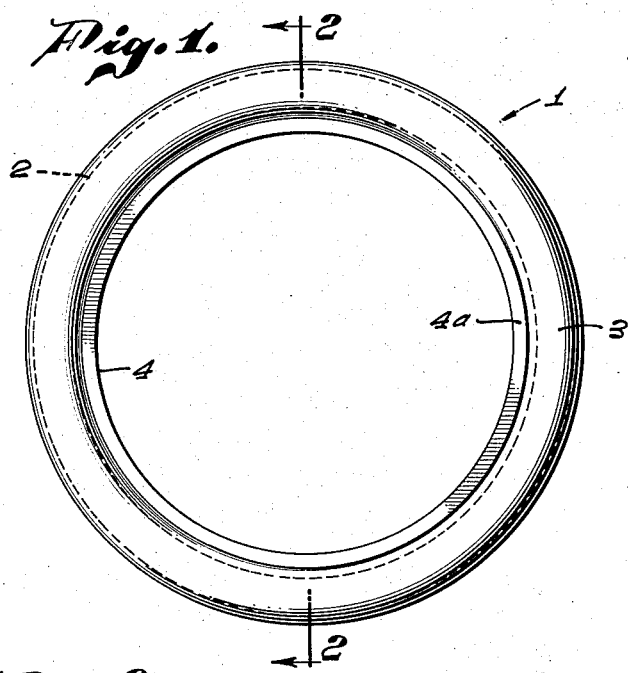
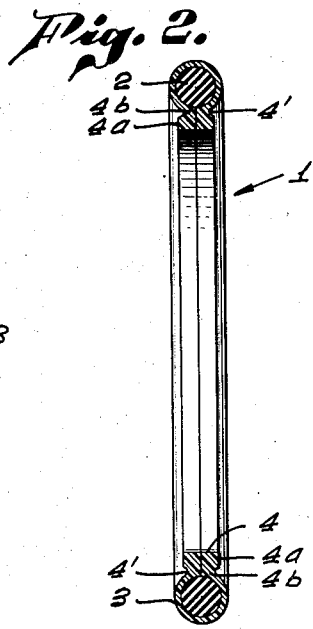
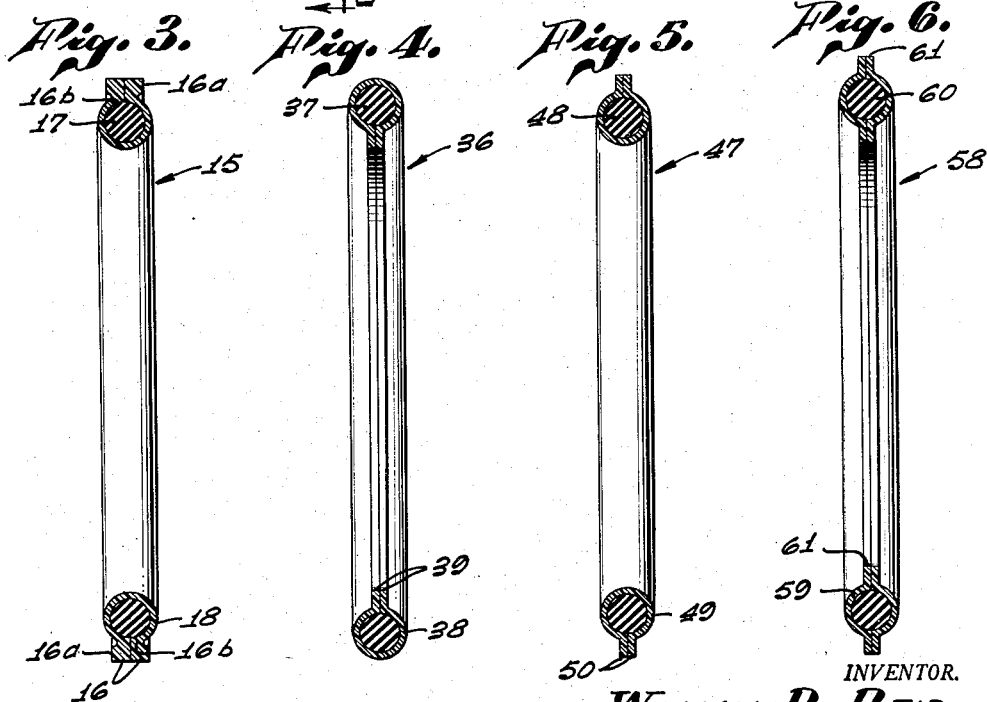
INVENTOR.
WILLIAM P. REID,
BY
Paul A. Weilein
ATTORNEY.

Nov. 4, 1958 W. P. REID 2,859,061
COMPOSITE SEALING RING AND METHOD OF MAKING THE SAME
Filed Sept. 17, 1954 4 Sheets-Sheet 2
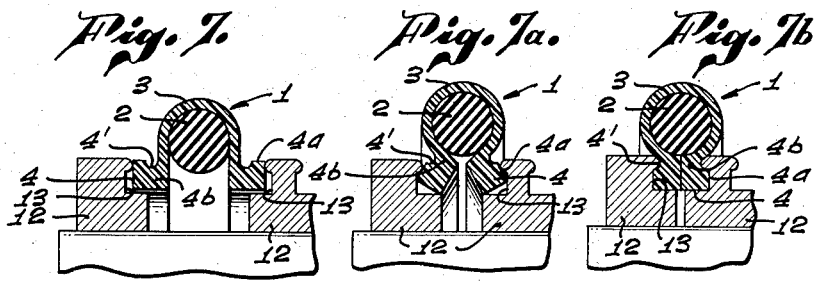
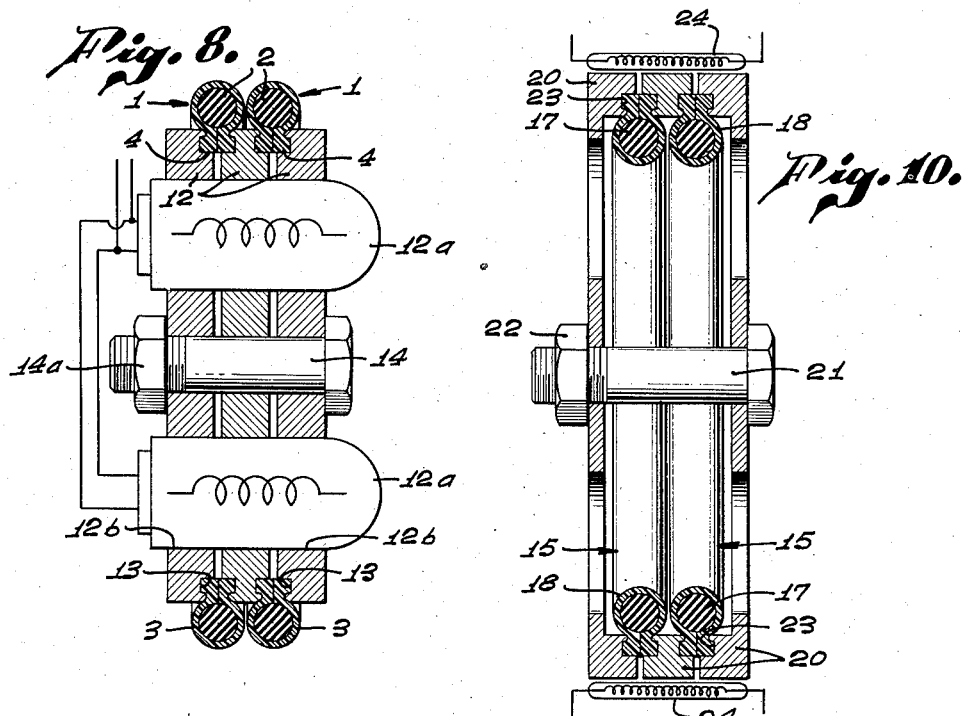
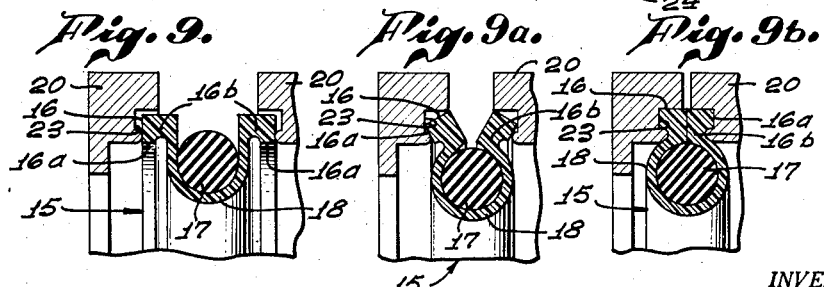
INVENTOR.
WILLIAM P. REID,
BY
Paul A. Weilein
ATTORNEY.

Nov. 4, 1958 W. P. REID 2,859,061
COMPOSITE SEALING RING AND METHOD OF MAKING THE SAME
Filed Sept. 17, 1954 4 Sheets-Sheet 3
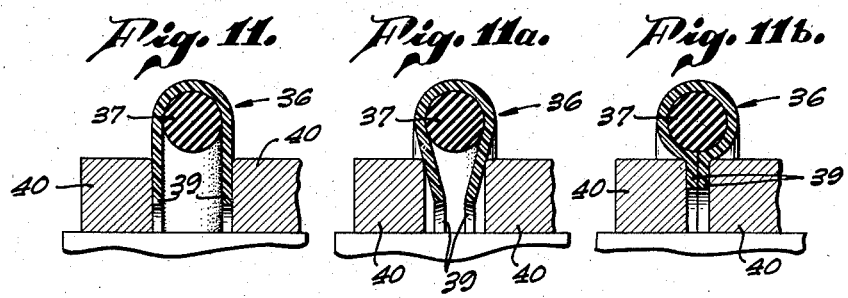
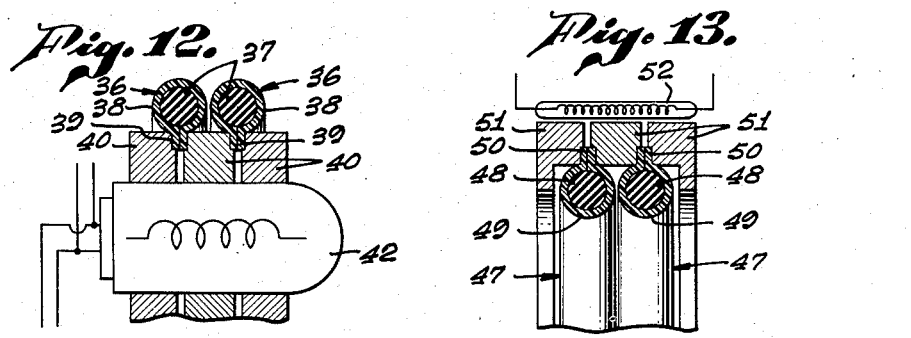
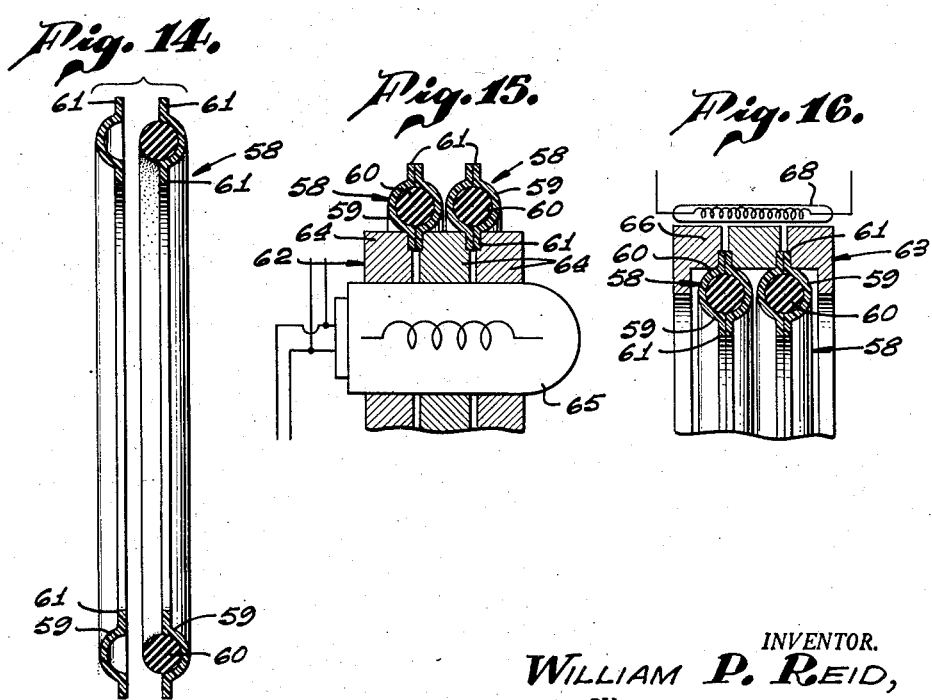
INVENTOR.
WILLIAM P. REID,
BY
Paul A. Weilein
ATTORNEY.

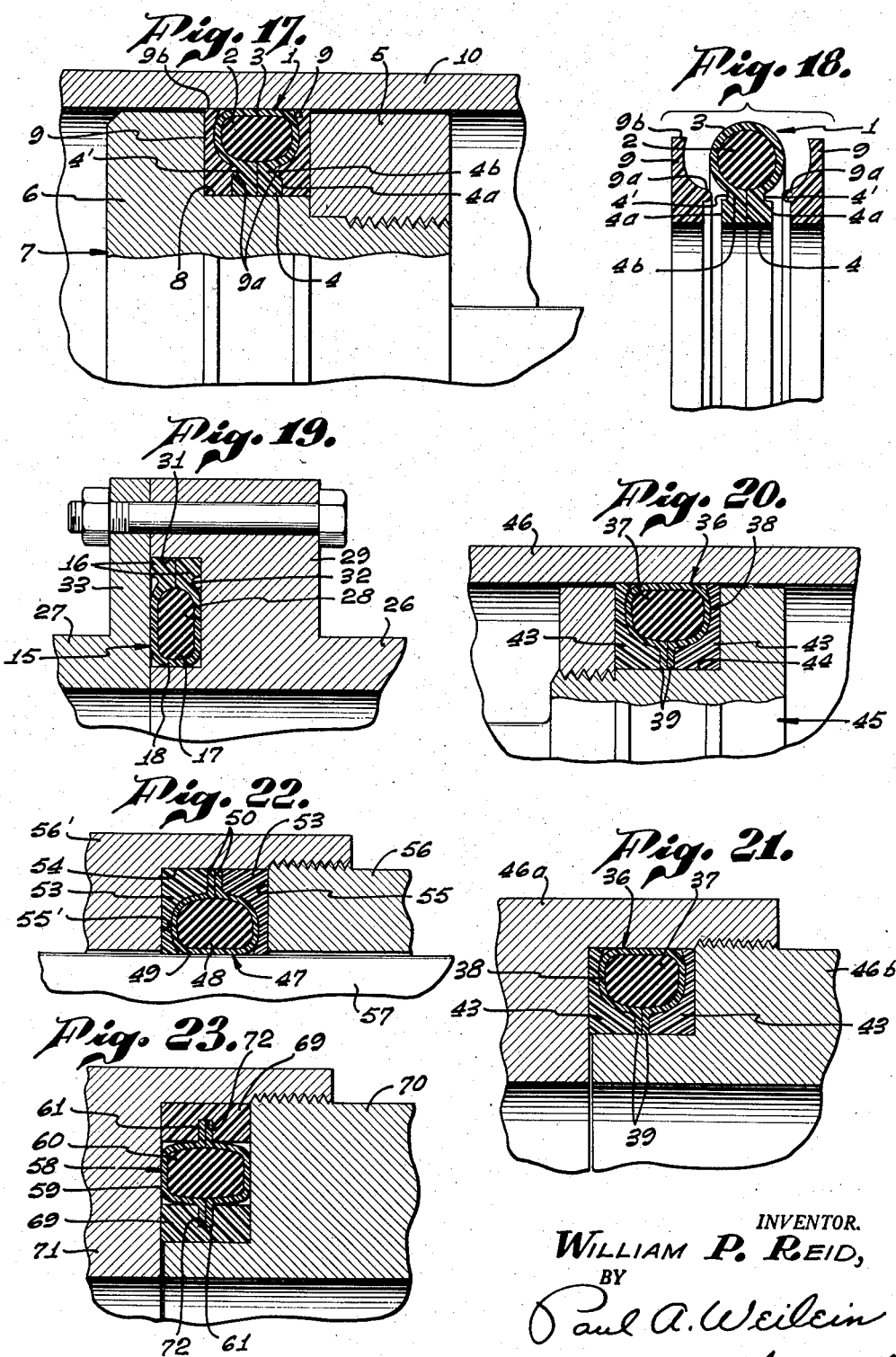

United States Patent Office 2,859,061
Patented Nov. 4, 1958

2,859,061
COMPOSITE SEALING RING AND METHOD OF MAKING THE SAME

William P. Reid, Lakewood, Calif.

Application September 17, 1954, Serial No. 456,794

8 Claims. (Cl. 288—2)

This invention relates in general to sealing rings and in particular to sealing rings of the type having a core of one material and a protective covering of another material.

It is known that composite sealing rings having an elastomer core and a protective covering have been produced in seeking to provide adequate resiliency under extreme high and low temperatures as well as to increase resistance to deterioration under exposure to hydrocarbon liquids, gases, acids and chemicals.

Insofar as I am aware, such composite rings have failed to solve the problem of chemical attack and temperature-effected impairment, due to the nature of the materials employed, or to the construction of the rings, or the methods employed in making the rings, or to all of these factors.

It is therefore an object of this invention to provide a composite sealing ring which is superior to composite rings as heretofore made, in point of pronounced resistance to wear, pronounced resistance to chemical attack, and pronounced resistance to impairment of the resiliency of the ring under extremely high and low temperatures.

It has been found that excellent results are contained in making the elastomer core of a composite sealing ring fabricated in accordance with this invention, of a highly resilient and elastic rubber-like silicone material, for example, material known as "Silastic." A protective covering for this core is made of a material which has less elasticity and abrasive action than the core, but has greater resistance to wear and chemical attack than the core, and is highly resistant to impairment under extreme temperatures, for example a polytetrafluoroethylene material, one of which is known as "Teflon."

Further, it has been found that it is essential to construct a composite ring made of the aforementioned or equivalent materials, in a particular manner in order that such materials successfully may be employed in the fabrication of a sealing ring having the desirable qualities herein noted.

Accordingly, it is another object of this invention to provide a new and highly efficient method of making a composite sealing ring embodying the advantageous features herein specified.

It is another object of this invention to provide a composite sealing ring such as described, in which the flexible protective covering for the elastomer core is constructed to facilitate the enclosure of the core as well as the retention of the ring in the proper position to maintain an effective seal between static or movable parts.

Further, it is an object hereof to provide a composite sealing ring such as described wherein the flexible covering for a preformed elastomer core is also preformed to provide protruding portions or lips which facilitate the sealing of the covering about the core as well as make possible a reliable holding of the ring in the desired position to form an effective seal between relatively movable or static members.

It is another object of this invention to provide a composite sealing ring such as described in which the protective covering for the elastomer core is preformed as an annulus of channel-shape in cross section such that the elastomer core may be positioned in the channel of the preformed covering with marginal portions of the latter disposed to be brought into engagement with one another to seal the covering around the core.

It is a further object of this invention to provide a sealing assembly which comprises a composite sealing ring such as described and a pair of opposed clamping or back-up rings which maintain the covering and the ring in place, prevent the seal of the covering from being broken under the stresses developed in usage of the ring, as well as prevent extrusion of the composite ring from an effective sealing position.

Further, it is an object hereof to provide a composite sealing ring which is constructed so as to be interlocked with clamping or back-up rings to maintain the composite ring sealed and in the desired sealing position between static or movable parts.

Another object of this invention is the provision of a novel method of sealing the protective covering around the core of a composite sealing ring embodying the present invention.

An additional object of the invention is the provision of a composite sealing ring of the character described in which the protective covering for the elastomer core of the ring may be preformed in one annular piece or in annular sections, with provision in either case for effectively sealing the covering. In the sealing of the covering a protruding lip is formed or a pair of such lips are formed. These lips have the dual function of maintaining an effective seal of the covering and holding the composite ring in place when confined between clamping rings or confined between opposed surfaces of members between which it is desired to provide a sealed joint or a movable seal.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is an elevational view of a composite sealing ring embodying the present invention;

Fig. 2 is a sectional view, taken on the line 2—2 of Fig. 1;

Fig. 3 is a sectional view of a modified form of the composite sealing ring;

Fig. 4 is a sectional view of another modified form of the composite sealing ring;

Fig. 5 is a sectional view of another modified form of the sealing ring;

Fig. 6 is a sectional view of still another modified form of the sealing ring;

Fig. 7 is a fragmentary sectional view illustrating the manner in which the preformed covering and the core for the ring shown in Figs. 1 and 2 are initially assembled in preparation for enclosing the core within the covering;

Fig. 7a is a sectional view similar to Fig. 7, showing the manner in which the marginal portions of the covering of the ring assembly shown in Fig. 7 are forced together;

Fig. 7b is a sectional view similar to Fig. 7, showing how the covering of the assembly shown in Fig. 7 is finally positioned to be sealed in enclosing relation to the core;

Fig. 8 is a sectional view showing how sealing means for the ring shown in Figs. 1 and 2, are arranged to simultaneously seal a pair of such rings;

Fig. 9 is a fragmentary sectional view showing how the covering and the core for the modified form of the ring shown in Fig. 3 are initially positioned in sealing means therefor preliminary to closing the covering around the core;

Fig. 9a is a view similar to Fig. 9, showing how the sealing means is operated to bring together the margins of the preformed covering shown in Fig. 9;

Fig. 9b is a view similar to Fig. 9, showing how the covering of the ring shown in Fig. 9 is finally positioned for being sealed around the core;

Fig. 10 is a sectional view of sealing means for sealing the covering around a pair of rings of the modified form shown in Fig. 3;

Fig. 11 is a fragmentary sectional view showing the manner in which the modified form of the ring shown in Fig. 4 is initially assembled and positioned in sealing means therefor;

Fig. 11a is a view similar to Fig. 11, showing how the covering of the ring in Fig. 11 is closed around the core of the ring;

Fig. 11b is a view similar to Fig. 11, illustrating the covering of the ring shown in Fig. 11 in position to be sealed around the core;

Fig. 12 is a fragmentary sectional view of sealing means for the modified ring shown in Fig. 4, as arranged to seal a pair of such rings;

Fig. 13 is a view similar to Fig. 12, of sealing means for the modified form of composite ring shown in Fig. 5;

Fig. 14 is an exploded sectional view of the modified form shown in Fig. 6, illustrating the manner of assembling the divided covering and the core;

Fig. 15 is a fragmentary sectional view of sealing means for the modified ring shown in Figs. 6 and 14, as arranged to simultaneously seal the lips on one side of a pair of such rings;

Fig. 16 is a fragmentary sectional view of sealing means for sealing the lips on the other side of a pair of the rings shown in Figs. 6 and 14;

Fig. 17 is a fragmentary section illustrating one use of the ring shown in Figs. 1 and 2, together with clamping rings, as a piston ring assembly;

Fig. 18 is a fragmentary exploded sectional view of the piston ring assembly shown in Fig. 17, illustrating the manner in which the composite ring and the clamping rings may be assembled;

Fig. 19 is a fragmentary sectional view showing how the modified form of ring shown in Fig. 3 may be used as a static seal between two members;

Fig. 20 is a fragmentary sectional view showing how the modified form of composite ring shown in Fig. 4, together with clamping rings, may be used as a piston ring assembly;

Fig. 21 is a fragmentary sectional view showing how the modified ring shown in Fig. 4, together with clamping rings, may be used as a static sealing assembly;

Fig. 22 is a fragmentary sectional view showing how the ring illustrated in Fig. 5, together with clamping rings, may be mounted as a unit on a stationary member to seal against a movable member; and Fig. 23 is a fragmentary sectional view showing how the modified ring shown in Fig. 6, together with clamping rings, may be used as a static seal.

Before describing the construction of the composite sealing rings and the methods of making the same, it will be pointed out wherein the elastomer core made of a silicone material (known as "silastic"), and the protective covering material embodying polytetrafluoroethylene, (known as "Teflon"), are desirable in rings embodying the present invention.

This core material is desirably soft, elastic, resilient, and resistant to impairment of these qualities under extremely high and low temperatures, but is somewhat undesirable as to abrasiveness, low mechanical strength and porosity, as well as its susceptibility to impairment when exposed to certain gases, liquid and chemicals.

In order to obtain the benefits of the desirable qualities of this core material in a sealing ring, the material forming the covering must have qualities which compensate for those qualities of the core material which are undesirable.

Accordingly, the covering material, for example, polytetrafluoroethylene ("Teflon"), has the desirable qualities of marked resistance to impairment under high and low temperatures as well as when exposed to certain liquid, gases, and chemicals which would impair the core material. It also has a low coefficient of friction and much greater strength and resistance to wear than the core material. However, this covering material, although flexible and deformable, has but little elasticity and tends to take a permanent set under prolonged pressure.

It will now be apparent that the elasticity and resiliency of the core material will compensate for the lack of elasticity of the flexible covering material, thereby preventing the covering material from taking a permanent set and impairing the ring. On the other hand the toughness, strength and low friction coefficient, of the covering material compensates for the weakness and friction producing qualities of the core material; also compensates for the susceptibility of the core material to chemical attack.

As shown in Figs. 1 and 21, one form of composite ring embodying the present invention is generally designated 1 and comprises an annular elastomer core 2 and a flexible covering 3 enclosing the core.

The core 2 is made of an elastic end resilient rubberlike material such as hereinbefore described and in the present embodiment is of circular cross section, although it is obvious it may be made of other cross sectional shapes as desired.

The flexible covering 3 is made of a tougher and less elastic material than the material of which the core is formed, for example, the material hereinbefore noted. In this connection, it is to be understood that the terms "elastomer core material" or "core material" or "core," as well as the terms "flexible covering material" or "flexible covering" or "covering," hereinafter appearing, refer to materials having the particular qualities hereinbefore specified.

As here shown, marginal portions of the covering 3 engage one another so that the covering completely encloses the core but is not sealed or bonded to the core. Accordingly, the covering is dimensioned so that it will conform to the cross sectional shape of the core 2 and at the same time provide opposed marginal sealing lips 4 which extend radially from the inner periphery of the ring in contact with one another.

These lips may be sealed by the application to the outer surfaces thereof of heat and pressure. This sealing is effected without sealing to the core that portion of the covering 3 which conforms to the cross sectional shape of the core.

It has been found that good results are obtained by machining or otherwise preforming the covering 3 so that it takes the form shown in Fig. 7. In this form the covering is annular and channel shaped in cross section. The depth of the channel is greater than the diameter of the core 2 so that when the core is bottomed in the channel there will be provided sufficient material to enclose the core and form the sealing lips 4.

The lips 4 are enlarged adjacent their outer ends in a direction axially of the ring, thereby forming flanges 4a joined to the main body of the covering 3 by narrow necks 4b, as seen in Figs. 2 and 7. This construction provides annular grooves 4' between the flanges 4a and the body of the covering when the latter is closed around the core.

In Fig. 17, where one use of the composite ring 1 is illustrated, threadedly connected sections 5 and 6 of a piston 7 form an annular groove 8 for reception of the composite ring. This ring is confined in the groove 8 between a pair of opposed clamping or back-up rings 9. As shown in Fig. 18, the opposed surfaces of the rings 9 are shaped to conform to the sealing ring 1 when the latter is compressed, as shown in Fig. 17, by its sealing contact with the cylinder 10 in which the piston 7 is operable. The flanges 4a interlock with the clamping rings, as the latter are provided with annular ribs or projections 9a which engage in the grooves 4' and abut oposite sides of the necks 4b, thereby interlocking the clamping rings with the sealing ring. Outer marginal portions 9b of the clamping rings engage the cylinder 10 to prevent extrusion of the sealing ring 1 from proper sealing engagement with cylinder 10.

It will now be apparent that the lips 4 with the flanges 4a and neck 4b formed thereon, not only facilitate the enclosure of the core 2, but interlock with the clamping rings 9 to assure that the covering will be held in enclosing relation with the core 2 and that the ring 1 will be restrained from displacement and extrusion relative to the groove 8. Moreover, in having the lips 4 confined between the rings 9 as here provided, the necks 4b of the lips are held against such movement relative to the ring proper as might break the seal formed by the lips or weaken the lips at the necks 4b.

The clamping rings 9 may be made of the same material as the covering 2, or of any other suitable material, although it has been found that "teflon," hereinbefore noted, is well suited, such material being machined or otherwise preformed to the shape described herein.

The sectional construction of the piston 7 is necessary as the ring 1, due to the lack of elasticity of the covering 3 cannot be stretched sufficiently to be mounted in an ordinary ring groove.

A method of making the ring 1 as shown in Figs. 1 and 2, will now be described.

After the covering 3 has been preformed to the shape shown in Figs. 2 and 7, the core 2 in being elastic may be easily collapsed so as to be positioned in the channel of the covering. Next the assembly in the form shown in Fig. 7 is placed between pressure applying and sealing members 12. These members are annular and provided with recesses 13 in opposed faces thereof shaped to receive and conform to the flanges 4a of the lips 4 of the covering 3.

After this positioning of the ring 1, the members 12 are moved toward one another, as shown in Figs. 7, 7a, and 7b to press the opposed lips 4 and flanges 4a in intimate contact with one another.

Fig. 8 illustrates the next sealing step as carried out with the apparatus for applying heat and pressure simultaneously to the sealing lips 4 of a plurality of the rings 1. In this apparatus two of the composite rings are confined between three of the annular members 12.

A clamping bolt 14 and a nut 14a are associated with the three members 12, as shown in Fig. 8, for releasably holding the latter assembled and for applying pressure to the sealing lips 4 of the rings through the members 12.

Heat is applied through the members 12 to the sealing lips 4 in any suitable manner while the latter are under pressure. One means for applying heat may, as here shown, comprise a series of electrically operated cartridge heaters 12a mounted in a series of openings 12b in the members 12 so that the heat developed is applied only to the lips 4.

It has been found that a pressure of the order of 75 p. s. i. and heat at a temperature of the order of from 650° to 700° F., when applied to the sealing lips 4, will produce a reliable sealing of the lips. Pressure against the lips is increased by the thermal expansion of the material of the covering inasmuch as this expansion is greater than that of the members 12 under the aforesaid temperatures. These temperatures and pressures are maintained for from approximately 45 minutes to complete the bonding of the lips 4 to one another.

Fig. 3 illustrates a composite sealing 15 which is a modification of the ring 1 shown in Fig. 1, only as to the location of the sealing lips 16, being otherwise identical with the ring 1 as to material and construction. Accordigly, the ring 15 includes an elastomer core 17 and a protective covering 18 corresponding to the core and covering shown in Fig. 1, except that the lips 16 extend radially from the outer periphery of the ring. The lips 16 have flanges 16a and a neck 16b corresponding to the flanges 4a and neck 4b of the lip 4 shown in Fig. 1.

With reference to Fig. 9, it will be seen that the elastic core 17 may be stretched so as to be fitted into the channel of the preformed covering 18 in preparation for mounting this assembly between annular sealing members 20, as shown in Figs. 9, 9a and 9b, for closing the covering around the core 17 in substantially the same manner as shown in Figs. 7, 7a and 7b, except that the covering of the ring 15 is formed so that the channel thereof opens on the outer periphery thereof.

Fig. 10 shows apparatus for sealing the lips 16 of a pair of the rings 15. This apparatus is similar to that shown in Fig. 6 in that it includes three of the annular sealing members 20, a bolt 21 and nut 22 arranged to move the members so as to clamp the lips 16 therebetween. The flanges 16a are received in recesses 23 corresponding to the recesses 13 in the clamping rings 9, but located adjacent the inner periphery of the members 20.

Heat and pressure, such as applied by the sealing apparatus shown in Fig. 8, are also applied to the members 20 shown in Fig. 10. The pressure is regulated by manipulation of the bolt 21. The requisite heat may be applied in any suitable manner through the members 20. As here shown, electrically operated band type heaters 24 are applied to the outer peripheries of the members 20, whereby the lips 16 will be sealed in the same manner as described in connection with the sealing of the ring 1.

One use of the ring 15 shown in Fig. 3, is illustrated in Fig. 19, where the ring forms a static seal in a joint of two members 26 and 27. In this use, the ring is seated in an annular groove 28 in a flange 29 of the member 26, with the inner periphery of the ring compressed against the inner side wall of the groove, while the lips 16 are engaged with the outer side wall 31 of the groove, as well as against the bottom wall 32 of the groove and the flange 33 of the other member 27. The surfaces of the ring proper opposed to the flange 33 and bottom 32 of the groove 28, form seals thereagainst.

In this use of the ring 15 no clamping or back up rings are required, as the ring is surrounded by nonyielding walls. However, in other uses of this form of sealing ring, clamping rings, such as the rings 9, may be employed.

Another modified form of this invention, as shown in Fig. 4, comprises a composite sealing ring 36 having an elastomer core 37 and a flexible covering 38 formed of the same material and of the same construction as the ring shown in Figs. 1 and 2, except that flanges are omitted from the sealing lips 39. Thus, the lips 39 are flat, straight and extend radially from the inner periphery of the ring.

As shown in Fig. 11, the flexible covering 38 for the ring 36 is preformed to provide an annulus of channel shape in cross section and has the elastomer core 37 bottomed in the channel thereof. Figs. 11, 11a and 11b show how the covering 38 is closed around the core 37 by use of the sealing members 40 between which the lips 39 are confined.

As shown in Fig. 12, two of the rings 36 are simultaneously sealed in apparatus similar to that shown in Fig. 8, including three of the sealing members 40. A bolt and nut clamping means, not shown, but similar to that shown in Fig. 8, are employed in connection with the members 40. A series of cartridge heaters 42 are arranged in the same manner as the cartridge heaters shown in Fig. 8. The same pressure and heat as employed to seal the first described form of this invention are applied to seal the rings 36.

One use of the sealing ring 36 is shown in Fig. 20, wherein the ring is confined between clamping rings 43 which conform to the shape of the ring and the lips 39. The clamping rings 43 and sealing ring 36 as a unit, are confined in a groove 44 in a sectional piston 45, with the sealing ring engaged with the cylinder 46 in which the piston is operable.

Fig. 21 illustrates another use of the ring 36, wherein, in combination with clamping rings 43, it forms a static seal between two members 46a and 46b.

Fig. 5 illustrates another modified form of sealing ring 47 identical with the ring 36, as to the core 48, covering 49 and lips 50, except that the lips 50 extend radially from the outer periphery of the ring.

Fig. 13 illustrates the method of sealing two of the rings 47 simultaneously between sealing members 51, which are heated by means 52 corresponding to the heating means shown in Fig. 10.

One use of the ring 47 is shown in Fig. 22, where the ring is confined between clamping rings 53 in a groove 54 formed between opposed shoulders 55 and 55' of two members 56 and 56'. In this use, the inner periphery of the ring 47 seals against a movable member 57.

Another modification of this invention, as shown in Figs. 6 and 14, comprises a sealing ring 58 in which the protective covering 59 for the elastomer core 60 is made in two annular sections each of which is channel shaped in cross section whereby the channel formed by the two sections will conform to and enclose the core. Each of the sections of the covering 59 is preformed of the same material as hereinbefore noted and provided on opposite margins with laterally extended sealing lips 61. The covering sections are applied to the core so that the lips 61 extend radially from the inner and outer peripheries of the ring.

The method of sealing the ring 58 is illustrated in Figs. 15 and 16, wherein the sealing means 62 for sealing the pair of lips 61 on one side of the ring is shown in Fig. 15, whereas the sealing means 63 for sealing the other pair of lips 61 is shown in Fig. 16. The sealing means 62 includes annular members 64 between which the lips 61 on one side of the ring are clamped. The annular members 64 are clamped and released by a bolt and nut arrangement, not shown, but similar to that shown in Fig. 8. These annular members are heated by the heating elements 65 corresponding to the heating elements shown in Fig. 8.

The sealing means 63 includes annular members 66 releasably clamped by bolt and nut means, likewise not shown, so as to confine therebetween the lips 61 on the side of the ring not available with the sealing means 62. A band heater 68 is applied to the periphery of the members 66 to supply requisite heat to the lips 61.

One use of the double-lipped ring 58, wherein the pairs of sealed lips 61 extend radially of the ring, is shown in Fig. 23. In this use, the ring is employed with a pair of clamping rings 69 as a static sealing assembly, between a pair of threadedly connected members 70 and 71. The clamping rings 69 are provided with grooves 72 to accommodate the sealed lips 61, whereby the ring 58 is held between the members 70 and 71.

I claim:

1. A method of making a composite sealing ring for use between relatively rigid curved surfaces which consists essentially in placing an annular preformed elastomer core of substantial and elastically compressible cross-section and slight circumferential stretchability within a protective flexible annular covering of channel shape in cross section, bringing the marginal portions of the covering together to enclose the core with the marginal portions in close contact with each other and protruding angularly from their point of contact with the core, and applying heat and pressure to the marginal portions to bond them to each other and to form a lip, the core being substantially unbonded to the cover.

2. The method of claim 1 in which the covering is composed of a pair of complementary annular sections each of which is channel shaped in cross-section and provided with a marginal lip, the marginal lips together forming the marginal portions in close contact with each other.

3. A composite sealing ring for use between relatively rigid curved surfaces including an annular elastomer core of substantial and elastically compressible cross-section and slight circumferential stretchability and a flexible protective annular covering of channel shape in cross-section for said core, marginal portions of said channel-shaped covering protruding angularly from their point of contact with the core, the marginal portions being bonded to each other to form a lip, the core being substantially unbonded to the cover.

4. The sealing ring of claim 3 in which the covering is composed of a pair of complementary annular sections each of which is channel shaped in cross-section and provided with a marginal lip, the marginal lips together forming the marginal portions in close contact with each other.

5. The sealing ring of claim 3 in which the marginal portions have flange portions extending outwardly therefrom.

6. A sealing assembly including a sealing ring having a protruding lip as in claim 3 and clamping rings engaging opposite sides of said sealing ring and opposite sides of said protruding lip with a portion of the sealing ring between said engaged sides disposed to form a seal against a member opposite said portion of said sealing ring.

7. The method of claim 1 in which the marginal portions extend outwardly away from the core, the lip being exteriorly of the covered annular core.

8. The method of claim 1 in which the marginal portions extend inwardly from the core, the lip being interiorly of the covered annular core.

References Cited in the file of this patent

UNITED STATES PATENTS

| | | |
|---|---|---|
| 1,057,762 | Muehlmatt | Apr. 1, 1913 |
| 2,456,356 | Aber | Dec. 14, 1948 |
| 2,459,721 | Poltorak | Jan. 18, 1949 |
| 2,466,643 | Magid | Apr. 5, 1949 |
| 2,528,719 | Clark | Nov. 7, 1950 |
| 2,580,546 | Hobson | Jan. 1, 1952 |
| 2,597,976 | Cousins | May 27, 1952 |
| 2,686,747 | Wurtz et al. | Aug. 17, 1954 |
| 2,717,023 | Hetherington | Sept. 6, 1955 |
| 2,753,074 | Schmid | July 3, 1956 |
| 2,774,621 | Kilbourne | Dec. 18, 1956 |